Feb. 16, 1960     O. L. CUNNINGHAM, JR     2,925,134
POWER IMPLEMENT WITH CONTROLLABLE SPEED
REDUCING DRIVE MECHANISM
Filed May 18, 1955     2 Sheets-Sheet 1
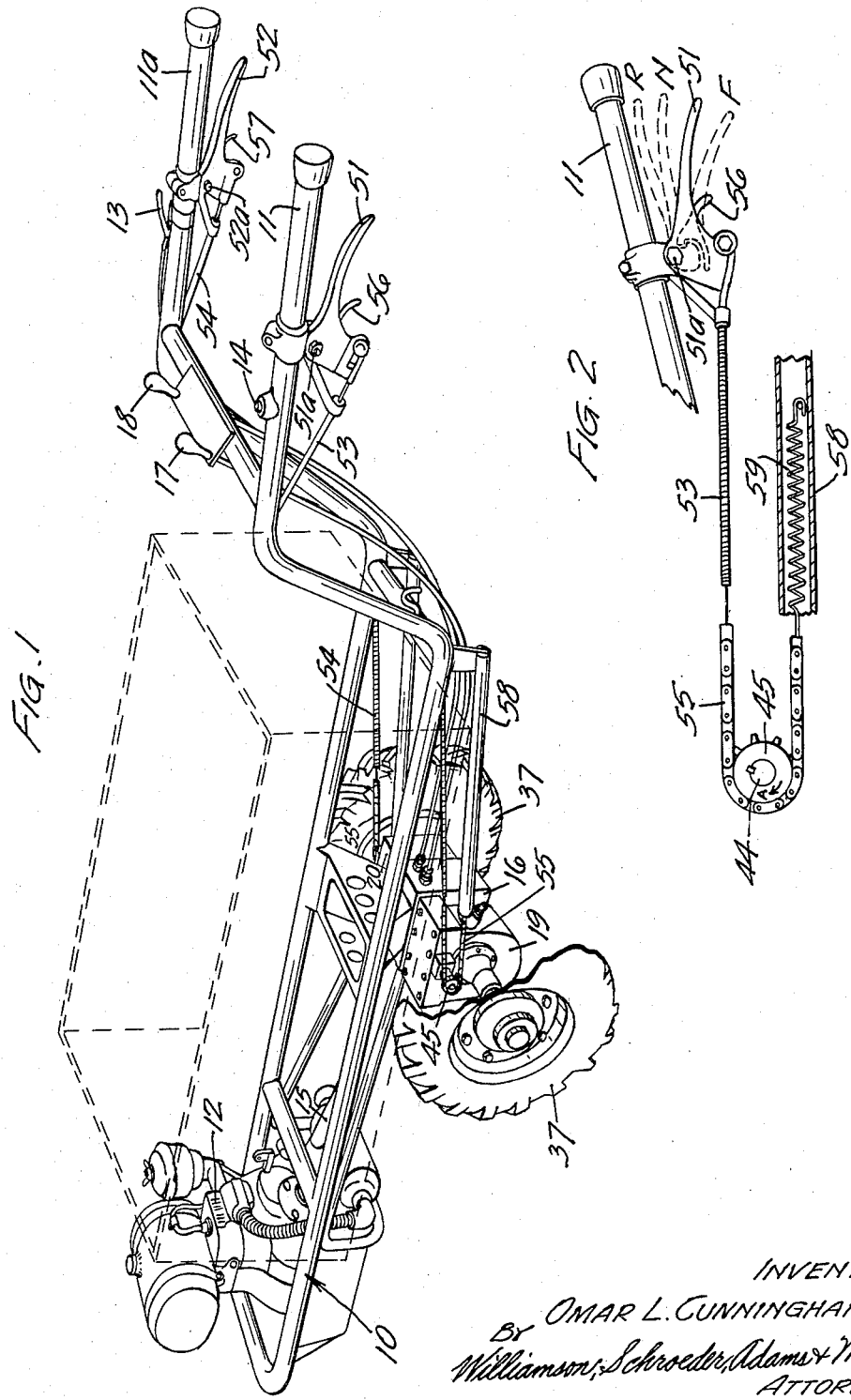
INVENTOR
OMAR L. CUNNINGHAM, JR.
By Williamson, Schroeder, Adams & Meyers
ATTORNEYS

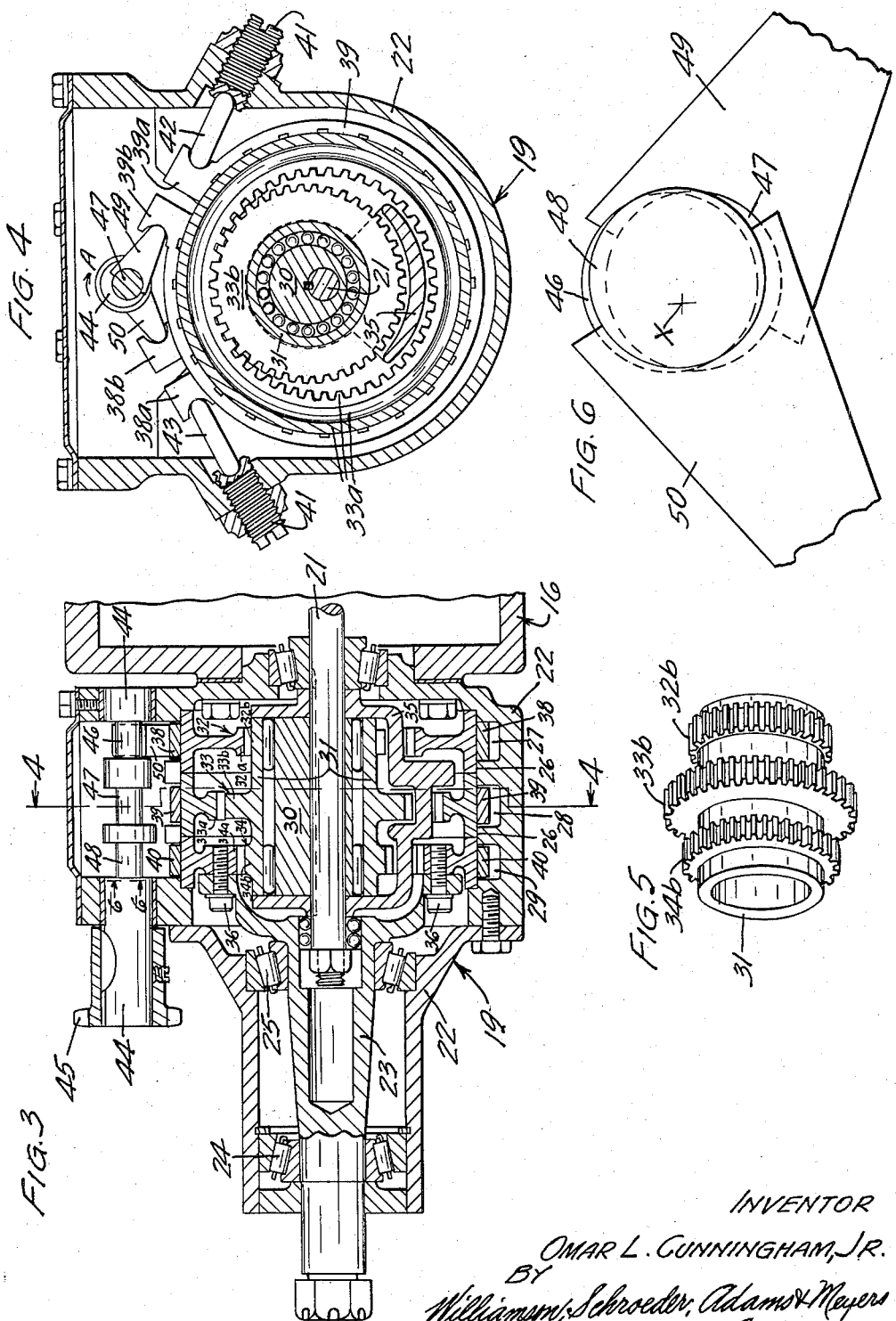

United States Patent Office 2,925,134
Patented Feb. 16, 1960

2,925,134

POWER IMPLEMENT WITH CONTROLLABLE SPEED REDUCING DRIVE MECHANISM

Omar L. Cunningham, Jr., Minneapolis, Minn., assignor to Toro Manufacturing Corporation of Minnesota, Minneapolis, Minn., a corporation of Minnesota Application May 18, 1955, Serial No. 509,208

3 Claims. (Cl. 180—6.66)

This invention relates to ground power implements and more specifically relates to apparatus for steering the implement and for controlling the rotary power transmitted to drive wheels of such an implement.

A principal object of my invention is to provide a new and improved rotary power transmitting apparatus for very materially reducing the speed and for controlling the application of rotary power to a torque load when driven from a high speed source of rotary power of a power implement.

Another object of my invention is to provide a ground power implement having controllable speed reducing gearing devices of the differential type for transmitting power from a high speed source of rotary power to the drive wheels of the implement and for separately controlling application of power to and the direction of rotation of the individual drive wheels to permit steering of the implement.

Still another object of my invention is to provide for a mobile power implement compact and light weight speed reducing apparatus for transmitting rotary power from a high speed source to the traction elements of the implement and which apparatus is controllable for causing the traction elements to turn in either direction, for permitting free rotation of the traction elements without regard to the source of power and for restricting rotation of the traction elements.

A further object of my invention is the provision of new and improved controls for a rotation controlling speed changing device of the differential type wherein it is necessary in controlling the operation thereof to selectively retain one of several gears.

These and other objects and advantages of my invention will more fully appear from the following description made in connection with the accompanying drawings wherein like reference characters refer to the same or similar parts throughout the several views and in which:

Fig. 1 is a perspective view of a mobile ground power implement including my invention therein;

Fig. 2 is a diagrammatic detail view of a portion of the controls comprising a portion of my invention;

Fig. 3 is a detail section view on a vertical plane through one of the drive and control mechanisms for one of the wheels.

Fig. 4 is a detail section view taken on a vertical plane substantially at 4—4 of Fig. 3;

Fig. 5 is a detail perspective view of a portion of the apparatus shown in Figs. 3 and 4;

Fig. 6 is a diagrammatic end view of the control cams of the speed reducing gearing mechanism as viewed from 6—6 of Fig. 3 to show their relative positions with respect to each other with their common center of rotation being indicated by letter X.

The ground power implement as shown in Fig. 1 includes a suitable supporting structure or framework 10 to which handles 11 and 11a are secured and upon which a high speed source of rotary power, such as engine 12 is mounted. Engine controls such as throttle 13 and the "kill button" 14 may be mounted on the handles. A power shaft 15 is connected to the engine 12 and is also connected into a transmission assembly 16 which may be controlled by the hand controls 17 and 18 mounted in proximity with handles 11 and 11a. Shaft 15 is connected through the transmission assembly 16 to the respective rotation changing gearing devices which are indicated in general by numerals 19 and 20. A single powered rotary element or shaft 21 extends through the transmission assembly 16 to deliver rotary power to each of the speed reducing gearing devices 19 and 20.

Speed reducing devices 19 and 20 are identical and the description of one will suffice for an understanding of both. The speed reducing gearing device 19 includes a frame member 22 which is secured to the supporting structure 10 through the housing of the transmission assembly 16 to which the frame member 22 is secured as by bolts. The gearing device 19 also includes a driven member or connecting member 23 which is mounted for rotation on frame member 22 and is thereby supported from the framework 10. Suitable bearings 24 and 25 are interposed between frame member 22 and the rotary driven member 23. Frame member 22 has an open interior which is defined by a plurality of spaced and annular interior surfaces 26 having their centers located at the rotation axis of the powered rotary element 21. Between surfaces 26 are provided three annular grooves or channels 27, 28, and 29.

An eccentric rotary camming element 30 is affixed to the powered rotary element 21 within frame member 22. A gyratory mounting 31 constituting a substantially cylindrical sleeve is journalled on the outer peripheral surface of the eccentric camming element 30.

The speed reducing gearing device 19 has a power-transmitting reference unit and a drive unit, which units include a plurality of power translation mechanisms and in the form shown, three such mechanisms are provided which are designated in general by numerals 32, 33 and 34 which may be respectively termed primary, secondary and tertiary power translation mechanisms. Translation mechanisms 32 and 33 comprise the reference unit and translation mechanism 34 comprises the drive unit. Said mechanisms include rotary gears of internal engagement type 32a, 33a and 34a, all of which have outer annular peripheral surfaces which are supported for rotation on the substantially cylindrical interior surfaces 26 of frame member 22 and coaxially of the rotation axis of the eccentric camming member 30. The power translation mechanisms 32, 33 and 34 also include rotary gears of external engagement type 32b, 33b and 34b, which are fixed to the gyratory mounting 31 in coaxial relation therewith and which are somewhat smaller than the corresponding internal gears and are partially meshed therewith. The relative gear ratios of the power translation mechanisms control the operation of rotation changing gearing device 19. Where, as in the form shown, the gearing ratios of the primary and secondary power translation mechanisms 32 and 33 are respectively smaller and larger than the gearing ratio of mechanism 34, the direction of rotation of driven member 23 and the drive wheel may be changed. Where the gearing ratios of translation mechanisms 32 and 33 are both larger or both smaller than the gearing ratio of mechanism 34, the speed of rotation of driven member 23 and the drive wheel may be changed. In any of these gear ratio relationships, the speed reduction produced by the gearing device 19 is very substantial. In the form shown the gearing ratios of the internal gears to the external gears of the mechanisms are forty-six to thirty-eight for mechanism 34, fifty-six to forty-eight for mechanism 33, and forty-two to thirty-four for mechanism 32.

A counterweight 35 is affixed to the powered rotary element 21 and is disposed between portions of the several internal and external gears to counterbalance the eccentric portion of the rotary camming element 30.

Driven member 23 is affixed by suitable means such as bolts 36 to the internal gear 34a of power translation mechanism 34. Driven member 23 is also adapted to be secured to the respective rotary traction element or wheel 37.

Means are provided in frame member 22 to restrict rotation of the individual internal gears 32a, 33a and 34a relative to frame member 22. Such means include a plurality of retaining elements 38, 39 and 40 which comprise elongated brake bands respectively surrounding and engaging the outer peripheral surfaces of internal gears 32a, 33a and 34a. As best shown in Fig. 4, one end of each of the brake bands is anchored to frame member 22. An adjustable set screw 41 is threadably mounted in one side of frame member 22 and is connected to the stationary end portion 39a of band 39 by a connecting lug 42. The anchored end portion 38a of band 38 engages its respective lug 43 and is thereby connected to the adjustable set screw 41 on the side of frame member 22 opposite to the anchoring of band 39. Brake band 40 is anchored to frame member 22 in a manner similar to that shown for brake band 39 and adjacent thereto on the same side of frame member 22.

The other end portions of the brake bands 38, 39 and 40 are circumferentially shiftable toward and away from the fixed end portions thereof, and end portions 39b and 38b of bands 39 and 38 respectively are shown in Figs. 3 and 4.

Shiftable control means are also mounted in frame member 22 for individually shifting each of the retaining elements or brake bands 38, 39 and 40 into rotation-restricting engagement with the corresponding internal gear. Such means include a rotary shaft 44 suitably journalled in frame member 22 adjacent the power transmission mechanisms and having a sprocket wheel 45 affixed thereto externally of frame member 22. A plurality of cams or cam actuators 46, 47 and 48 are secured to shaft 44 or may, as in the form shown, be formed integrally thereof. Cams 46, 47 and 48 are respectively positioned in proximity with the circumferentially shiftable end portions of bands 38, 39 and 40. Cam followers, such as 49 and 50 which are shown, provide connections between the cams and the respective brake bands, and the shiftable end portions of the brake bands thereby bear against the eccentric peripheral cam surfaces. As shaft 44 is rotated in the direction of arrow A, the cams will individually and sequentially shift their respective bands into rotation-restricting engagement with the respective internal gears. One suitable disposition of the eccentric cams 46, 47 and 48 relative to the rotation axis X thereof is shown in Fig. 6 where approximately one-half of a revolution of shaft 44 is necessary to successively bring all of the cams into operation for restricting the rotation of their corresponding internal gears. Of course the cams may be disposed in other relationships to obtain the same result with less turning of shaft 44. In normal position cam 47 will retain band 39 in constricted relation to prevent rotation of internal gear 33a relative to frame member 22. As the cams are rotated in the direction of arrow A, cam 47 will permit band 39 to be slightly distended to release the corresponding internal gear and thereafter cam 48 will cause the band 40 to be constricted for restricting rotation of gear 34a, after which cam 48 will release brake band 40 as shaft 44 continues to travel in the direction of arrow A. After brake band 40 has released gear 34a, shaft 44 must turn through a substantial arc before cam 46 begins to constrict band 38, and while the shaft is maintained within such an arc all of the internal gears of the translation mechanisms are free to rotate relative to frame member 22. Continued rotation of shaft 44 in the direction of arrow A will bring cam 46 to bear against the shiftable end portion 38b of band 38 so as to cause internal gear 32a to be restrained.

As is best shown in Figs. 1 and 2 hand controls 51 and 52 are respectively secured to handles 11 and 11a and are shiftable thereon about their respective pivots 51a and 52a. Hand controls 51 and 52 are connected by elongated flexible elements 53 and 54 such as cables, to their separate speed reducing devices. A roller chain 55 is secured to the end of cable 53 and is mounted on sprocket 45 for turning the same. As the hand control 51 is maintained in the full line position of Fig. 2, brake band 40 will restrain internal gear 34a with respect to the frame member 22. As hand control 51 is shifted to dotted position F, internal gear 33a will be restrained, when hand control 51 is shifted into dotted position N, all of the internal gears 32a, 33a and 34a will be free to rotate and when hand control 51 is shifted into dotted position R, internal gear 32a will be restrained.

Latching mechanisms having releasable triggers 56 and 57 are provided and the hand controls 51 and 52 will normally hold the same in their full line positions. Tension springs are secured to the end portions of the roller chains as is best shown in Fig. 2 wherein spring 59 is secured to the end of chain 55 and is anchored in a rigid element 58 of the supporting structure 10 of the implement.

*Operation*

When the engine 12 of the power implement is rendered operative, high speed rotary power is supplied to the powered rotary element or shaft 21 which supplies rotary power to each of the speed reducing gearing devices 19 and 20. Power transmission by the speed reducing devices is controlled by the hand control devices 51 and 52 and if both of the hand controls are released and permitted to shift into dotted position F, both of the drive wheels of the implement will rotate forwardly to impart a forward motion to the implement. By shifting one of the hand controls into a position similar to the full line position of hand control 51 as shown in Fig. 2, the corresponding drive wheel will be braked which will cause turning of the power implement because the other drive wheel is still turning forwardly. Shifting of both hand controls into a position similar to the full line position of control 51 in Fig. 2 will cause both drive wheels to be braked. If the hand controls are shifted to dotted position N, the drive wheels are completely released from the source of rotary power and are free to turn to permit the power implement to coast or to be manually pushed or turned. Shifting of the hand controls into dotted position R imparts a reverse turning movement to the drive wheels to reverse the direction of travel of the implement. The implement may be sharply turned by causing one of the drive wheels to rotate forwardly and the other to rotate rearwardly.

In order to cause power to be transmitted from the shaft 21 of the speed reducing device to the driven member 23 thereof and to the corresponding drive wheel, one of the rotary internal gears 32a or 33a must be retained in a fixed relation with respect to the frame member 22. If the hand control is shifted so as to cause cam 47 to bear against retaining band 39 so as to restrict the rotation of rotary internal gear 33a of the power translation mechanism 33, the gyratory movement and eccentric meshing of the rotary external gear 33b with the fixed internal gear 33a will result in a planetary movement of the external gear 33b in a reverse direction with respect to the rotation of shaft 21 and a corresponding planetary movement of the mounting sleeve 31 which is common to the external gears of all the translation mechanisms 32, 33 and 34. The gyratory movement and the planetary movement of external gear 34b, which are the same as the movements of external gear 33b, results in a rotary movement of internal gear 34a and a corresponding rotary movement of the driven member 23 and the corresponding drive wheel in a forward direction of rotation which is similar to the direction of rotation of drive shaft 21. Movement is also imparted to the rotary internal gear 32a of translation mechanism 32 which is free to idle and therefore has no effect.

When the hand control is again moved to release retaining band 39 and the corresponding internal gear 33a, and to shift cam 46 to cause the same to bear against retaining band 38 which grips rotary internal gear 32a and precludes rotation thereof, the gyratory movement and eccentric meshing of external gear 32b with the internal gear 32a will cause a planetary movement to be imparted to gear 32b in a direction counter to the direction of rotation of drive shaft 21 and will cause a corresponding planetary movement of the mounting sleeve 31 and the other external gears which are affixed to the sleeve. External gear 34b, which has a gyratory and planetary movement similar to that of external gear 32b, imparts a rotary movement to the internal gear 34a and the drive member 23 and the corresponding drive wheel in a reverse direction which is counter to the direction of rotation of the drive shaft 21.

The speed reduction from the rotary shaft 21 to the driven member 23 is very substantial when either of the rotary internal gears 32a or 33a is restrained so as to turn the driven member 23 in either direction. When the driven member 23 is turned in a forward direction, the speed reduction from the speed of the rotary shaft 21 is approximately twenty-five to one and where the driven member is turned in a reverse direction the corresponding speed reduction is approximately twenty-seven to one. The reversal of direction of rotation of internal gear 34 and driven member 23 is caused by the different gearing ratios of the power translation mechanisms 32 and 33 with respect to the gear ratio of power translation mechanism 34.

When the hand control is again shifted so as to cause retaining band 40 to restrict rotation of the corresponding internal gear 34a, the other rotary internal gears 32a and 33a are released and are free to idle and therefore no rotary power is transmitted to the internal gear 34a or driven member 23.

It will be seen that I have provided a new and improved ground power implement having controllable speed reducing gearing devices interposed between the high speed source of rotary power and the ground traction wheel for driving the wheels at a markedly reduced speed with respect to the source of power and for controlling the direction of rotation of the wheels.

It should also be noted that I have provided a novel rotation changing gearing device for a power implement which is compact and light weight and which is controllable to rotate the individual drive wheel of the implement in either direction at a markedly reduced speed to permit the rotation of the individual wheel to be varied and thereby permit the power implement to be steered.

It will be apparent that I have provided a new and improved speed changing gearing device which may be controlled to completely disengage the wheels from the source of rotary power and which may also be controlled to retain the drive wheels from undesired rotation.

It will, of course, be understood that various changes may be made in the form, detail, arrangement and proportion of the parts without departing from the scope of my invention which consists of the matter described herein and set forth in the appended claims.

What is claimed is:

1. A power implement having in combination a supporting structure having a source of high speed rotary power thereon, a pair of drive wheels, a powered rotary element operatively connected with such a source of rotary power and journalled in such a supporting structure, a pair of speed reducing gearing devices interposed between said powered rotary element and the drive wheels and each of said gearing devices comprising a rotary eccentric camming element connected to said powered rotary element, a gyratory mounting journalled on said eccentric camming element, primary, secondary and tertiary power translation mechanisms each including a rotary internal gear and a smaller rotary external gear eccentrically related to and engaging the corresponding internal gear, the gearing ratio of each of said power translation mechanisms being different than the gearing ratios of the other of said power translation mechanisms, all of said external gears being affixed to said gyratory mounting in coaxial relation therewith and in axially spaced relation with each other, a frame member secured to the supporting structure and having internal annular bearing surface means coaxially related with the camming element rotation axis, each of said internal gears having an external annular bearing surface peripherally engaging the internal surface means of the frame member and being rotatably mounted thereon, a plurality of retaining elements anchored on said frame member adjacent said primary, secondary and tertiary power translation mechanisms and being individually and selectively shiftable into rotation-restricting engagement with the internal gears thereof, a movable control member having camming means for individually shifting said retaining elements and a rotary driven member connected with a respective drive wheel and connected with the internal gear of said tertiary power translation mechanism, whereby said control member may be moved to individually shift said retaining elements into rotation-restricting engagement with the corresponding internal gears to cause said wheels to rotate forwardly, rearwardly, or in opposite direction and to stop said wheels.

2. The structure recited in claim 1 and said frame member having a plurality of annular openings extending around and through said internal annular surface means, each of said openings being disposed adjacent a respective internal gear and said retaining elements comprising brake bands each disposed in one of said openings encircling the respective internal gear and each of said bands having a fixed end anchored to said frame member and also having a shiftable end mounted for circumferential movement, and instantly operable actuating means controlled by said movable control member engaging said shiftable ends of said bands for selectively and individually shifting the same into rotation engagement with the respective internal gears.

3. A power implement having in combination a supporting structure, a source of high speed rotary power on the supporting structure and a pair of rotary traction elements, a finger-tip control element mounted on the structure for convenient operation by the operator of the implement and said control element being shiftable to a plurality of positions, a shiftable interconnection connected with said control element and being shiftable to a plurality of positions therewith, and a pair of rotation-changing gearing devices interposed between the source of power and a corresponding one of said traction elements, each of said devices comprising a frame member secured to the supporting structure, a rotary driven member connected with said frame member for relative rotation therewith and being connected with a respective rotary traction element, a rotary eccentric camming element journalled in said frame member and connected to the source of power to be driven thereby, a gyratory mounting journalled on said eccentric camming element, primary, secondary and tertiary power translation mechanisms each including a rotary gear of internal engagement type and also including a smaller rotary gear of external engagement type eccentrically related to and engaging the corresponding internal gear, the gearing ratios of said primary and secondary power translation mechanisms being respectively smaller and larger than the gearing ratio of said tertiary power translation mechanism, all of the gears of one engagement type being affixed to said gyratory mounting in coaxial relation therewith and all of the gears of the other engagement type being independently mounted on the frame member for rotation coaxially of the camming element rotation axis, said driven member being connected with said independently mounted gear of said tertiary power translation mechanism for rotation therewith, a plurality of retaining elements individually movably mounted on said frame member adjacent the respective independently mounted gears of said primary, secondary and tertiary translation mechanisms for movement into rotation-restricting engagement therewith, said shiftable interconnection being connected with said retaining elements for successive individual operation thereof in respective positions of the control element, the rotation of said independently mounted gear of said primary translation mechanism being restricted when said control element is shifted to one position, the rotation of the independently mounted gear of said secondary translation mechanism being restricted when said control element is shifted to another position, and the rotation of the independently mounted gear of said tertiary translation mechanism being restricted when said control element is shifted to still another position, whereby to facilitate simultaneous driving of the traction elements in similar or opposite directions and to individually stop said traction elements.

References Cited in the file of this patent

UNITED STATES PATENTS

| | | |
|---|---|---|
| 712,058 | Gloag et al. | Oct. 28, 1902 |
| 1,268,131 | Ledwinka | June 4, 1918 |
| 2,001,036 | Prince | May 14, 1935 |
| 2,260,344 | Shaw | Oct. 28, 1941 |
| 2,311,393 | Honeywell | Feb. 16, 1943 |
| 2,401,796 | Raitch | June 11, 1946 |
| 2,429,378 | Stuebner | Oct. 21, 1947 |
| 2,626,671 | Hardy et al. | Jan. 27, 1953 |
| 2,714,934 | Cassady | Aug. 9, 1955 |